United States Patent [19]

Carroll et al.

[11] Patent Number: 4,625,630
[45] Date of Patent: Dec. 2, 1986

[54] ROOF VENT AND METHOD OF MAKING SAME

[75] Inventors: Michael W. Carroll, Roselle; Michael E. Harwood, Palatine, both of Ill.

[73] Assignee: North American Agricultural, Inc., Schaumburg, Ill.

[21] Appl. No.: 645,039

[22] Filed: Aug. 27, 1984

[51] Int. Cl.[4] .............................................. F24F 7/00
[52] U.S. Cl. ..................................... 98/42.22; 55/309; 55/506; 98/55; 403/241; 403/382
[58] Field of Search ..................... 29/509, 521; 55/309, 55/310, 506; 98/42.16, 42.22, 55; 220/76, 77; 403/241, 242, 382, 403

[56] References Cited

U.S. PATENT DOCUMENTS

| | | | |
|---|---|---|---|
| 359,826 | 3/1887 | Walsh | 220/77 X |
| 2,447,472 | 8/1948 | Donley | 98/42.22 |
| 2,551,223 | 5/1951 | Schneider | 98/42.22 |
| 2,636,429 | 4/1953 | Parsons | 98/42.22 |
| 2,692,548 | 10/1954 | Knorr | 98/42.22 |
| 2,878,743 | 3/1959 | Trunnell | 98/42.22 |
| 2,992,701 | 7/1961 | White | 55/309 |
| 4,026,082 | 5/1977 | Crofoot | 98/37 X |
| 4,214,511 | 7/1980 | Mueller | 55/309 X |
| 4,480,534 | 11/1984 | Sloan | 98/55 |

FOREIGN PATENT DOCUMENTS

| | | | |
|---|---|---|---|
| 461366 | 11/1949 | Canada | 98/42.16 |
| 698609 | 11/1964 | Canada | 98/42.22 |

*Primary Examiner*—Harold Joyce
*Attorney, Agent, or Firm*—Fitch, Even, Tabin & Flannery

[57] ABSTRACT

A nestable roof vent for use on the roofs of grain bins and other structures where circulation of air within the structure is required. The vent includes a bird screen sized to extend across the interior of the vent housing that is secured to a flange over the opening in the bin roof so as to be free from binding contact with the vent housing. Accordingly, should the screen become clogged with husks or leaves, the screen will bend about the flange to release any pressure build-up before structural damage to the structure can occur. A locking seam, capable of being made along the curved edge of a piece of sheet metal, is also disclosed.

7 Claims, 10 Drawing Figures

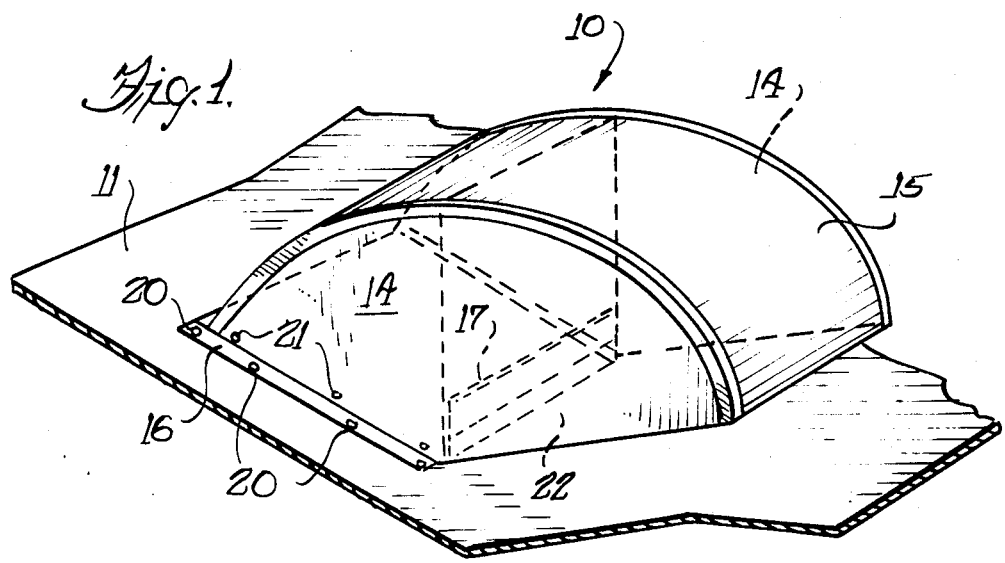
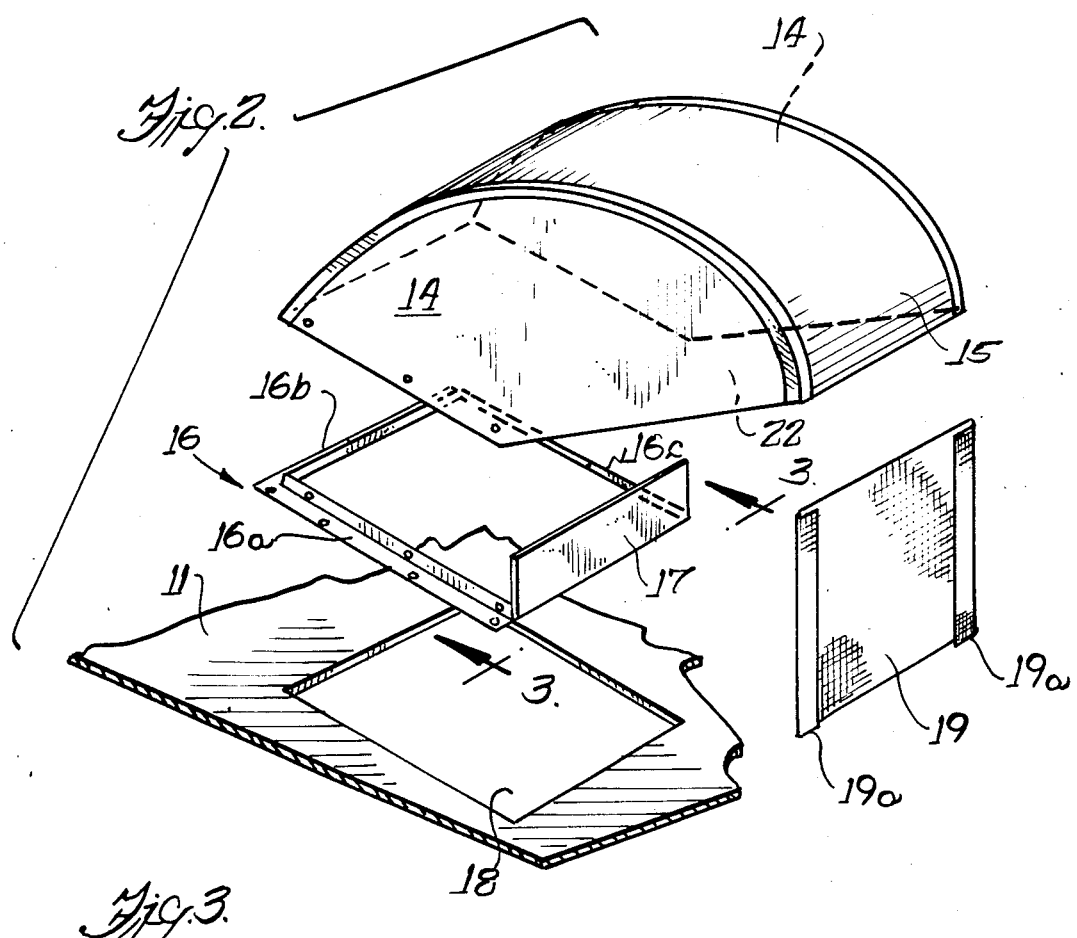
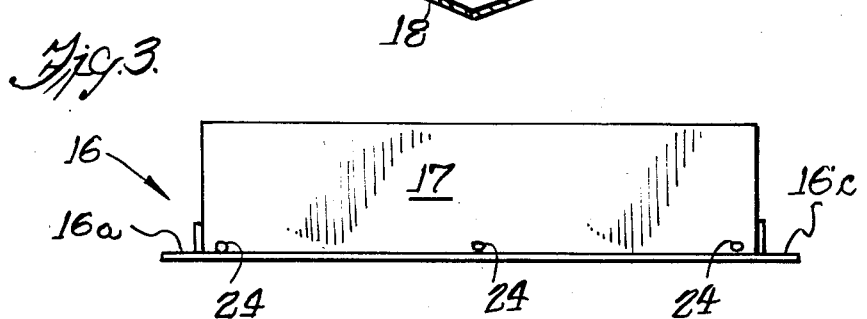

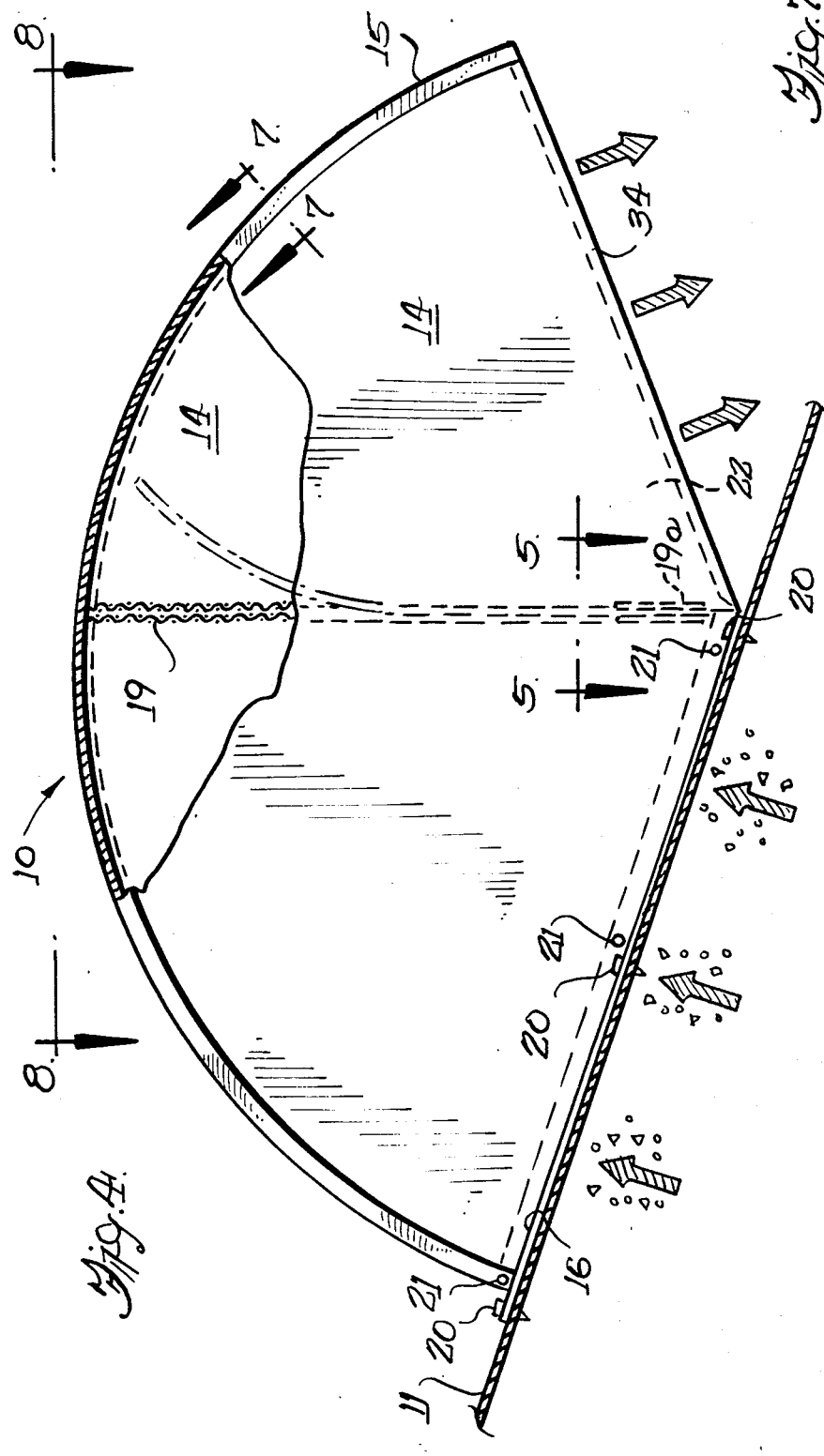
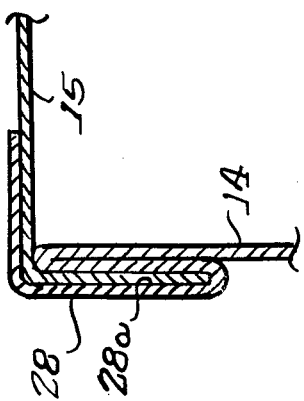
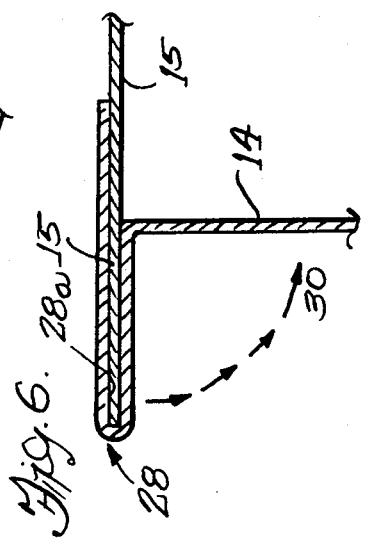
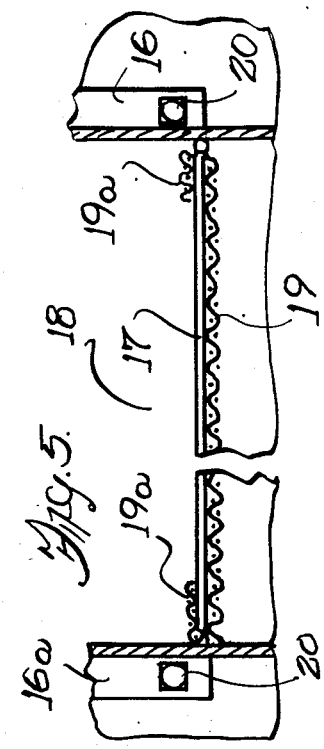

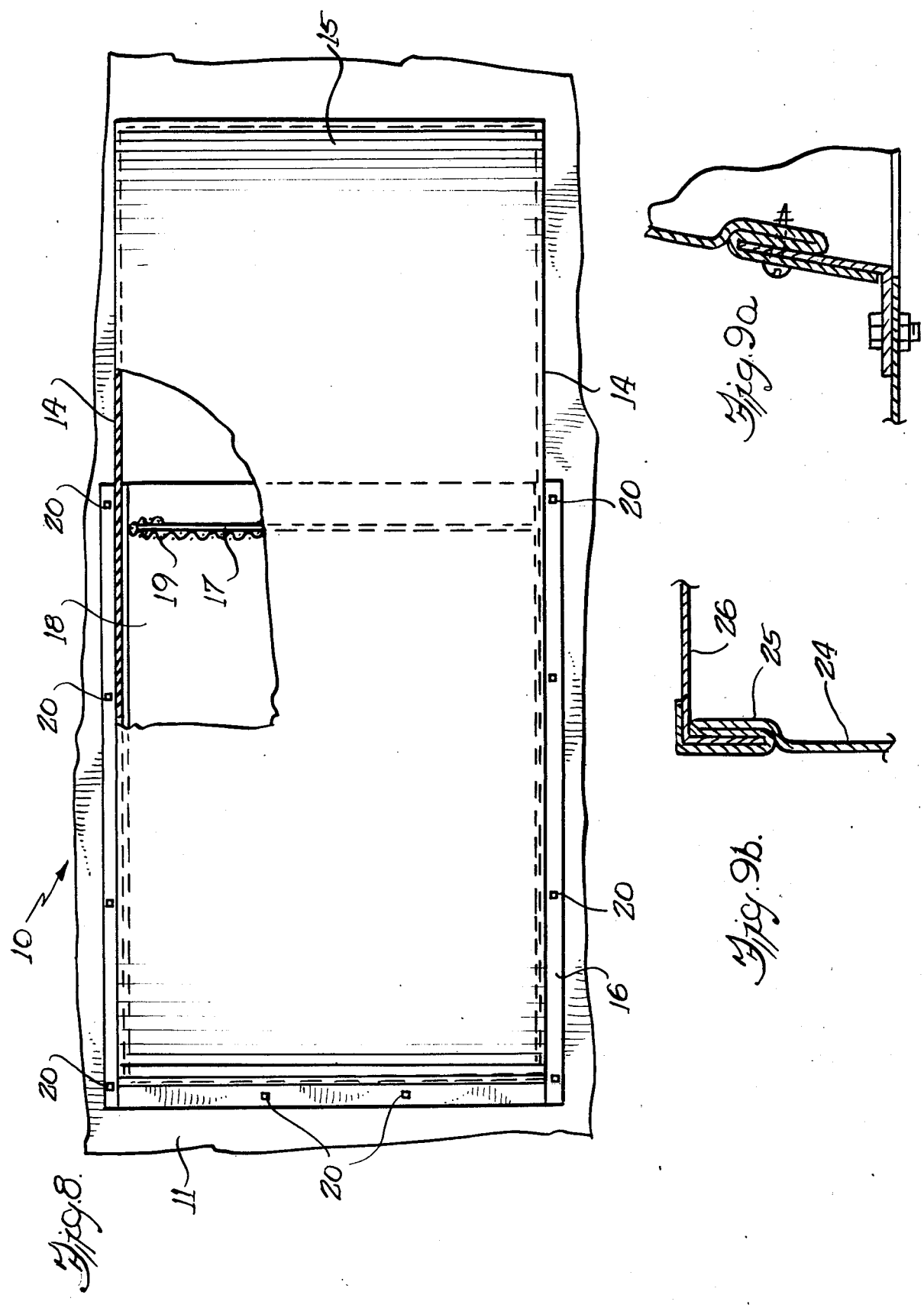

ROOF VENT AND METHOD OF MAKING SAME

The present invention relates to a vent for use on grain bins and similar structures where circulation of air within the structure is required, and more particularly to a nestable vent that is fail-safe so as to allow the egress of air should the vent become clogged.

Because each grain contains a living embryo enclosed by food tissues, the storage of grain requires the maintenance of an environment sufficiently dry and low in temperature so that the embryo will not begin active growth. Such an environment is also needed to reduce the development of mold on the grain. Accordingly, grain bins must be constructed so as to provide adequate circulation of air for drying and, additionally, to permit fumigation of the grain to destroy fungi and prevent insect infestation.

In practice, grain bins are constructed to permit circulation by forcing air through the floor of the bin and exiting the air through vents in the roof of the bin. In order to prevent birds or other pests from entering the bin through the vent, the roof vent will often include an integral screen disposed within its passageway. While the screen is effective in preventing the entry of such varmints into the grain bin, it may become clogged due to the circulating air carrying husks or leaves and the like into the vent. If the vent becomes clogged, the air that is forced into the grain bin may reach a sufficient pressure so as to cause structural damage to the bin itself.

Roof vents are typically constructed from sheet metal and, as with many products, the greatest expense in the fabrication of the vent is for the labor required to make and assemble the various pieces of the housing. Thus, any reduction in the amount of labor required to make the vent can result in significant cost savings.

During the construction of a grain bin, the bin vents typically arrive at the construction site prefabricated with the bird screen in place so as to facilitate installation of the vent. Due to this prefabrication, each vent must be shipped in a separate container. Because each grain bin typically requires a plurality of such vents, the separate packaging of each vent leads to increased transportation and packaging costs.

In light of the foregoing, it is a principal object of the instant invention to provide a roof vent that will allow for the passage of circulating air should its associated screen become clogged with husks or leaves, thus avoiding structural damage to the bin due to the internal build-up of air pressure.

A further object is to provide a vent housing of sheet metal that requires less labor to assemble than presently available sheet metal vents.

An additional object is to provide a roof vent that is nestable so as to facilitate the shipment of a plurality of vents in a single package.

These and other objects and advantages of the invention will become apparent upon reading the following detailed description and upon reference to the figures of the drawings, in which:

FIG. 1 is a perspective view of the inventive vent in place on a grain bin roof;

FIG. 2 is an exploded perspective view of the roof vent of FIG. 1;

FIG. 3 is an end view of the roof mounting flange for the vent housing taken substantially along line 3—3 of FIG. 2;

FIG. 4 is a side view of the roof vent of FIG. 1 taken in partial cross section;

FIG. 5 is a cross-sectional view of the roof vent taken substantially along line 5—5 of FIG. 4;

FIG. 6 is a cross-sectional view showing a step in the making of the seam that joins together the top and side members of the vent housing;

FIG. 7 is a cross-sectional view taken substantially along line 7—7 of FIG. 4 showing the finished seam that joins together the top and side members of the vent housing;

FIG. 8 is a top view of the roof vent taken along line 8—8 in FIG. 4; and

FIG. 9a and 9b show prior art seams for joining together two pieces of sheet metal.

Turning now to the drawings, in FIG. 1 there is seen a vent, generally indicated by 10, embodying the features of the instant invention and in place on the roof 11 of a grain bin or the like. The vent 10 includes a housing or hood 12 constructed from a pair of side members 14 and a top member 15. The housing is secured to the grain bin roof 11 by means of a flange 16 that fits over an opening 18 in the roof.

The flange 16 is fabricated from three L-shaped angles 16a, 16b, 16c and an upwardly extending baffle 17, all secured together by means of welding or the like. In practice, the baffle 17 coextensive with the lower edge of the roof opening 18 and is secured at an angle with respect to the other members 16a, 16b, 16c of the flange 16 so that, when the flange 16 is secured to the bin roof 11, the baffle 17 is more or less vertical (best seen in FIG. 4). The baffle 17 extends across the width of the vent at the juncture of the roof opening 18 and the exit 22 of the vent so as to inhibit the entry of water or snow and the like into the bin through the vent. As an option, the baffle 17 may include holes 24 (see FIG. 3) at the lower edge thereof to permit the drainage of condensation and the like that may form on the inside of the vent. In practice, the flange 16 and the vent housing or hood 12 are fabricated from 24-gauge galvanized sheet steel. The flange 16 is secured to the roof 11 by means of bolts 20. Caulking is used to seal the edges of the flange 16 with respect to the roof 11, and the hood 12 is, in turn, secured to the flange by means self-tapping screws 21. Further, the straight edges of the side members 14 and top member 15 may be folded back on themselves for a rigidifying hem, such as that shown by 34 in FIG. 4.

Secured on the interior of the housing to the flange is a bird screen 19 that extends across the interior of the housing so as to prevent ingress or egress through the vent 10 other than through the screen 19. In accordance with the invention, the bird screen 19 is secured within the housing 12 to the baffle 17 so as to be free from binding contact with the housing side members 14 and top member 15. Thus, if the bird screen 19 should become clogged due to an accumulation of husks or leaves, which prevent the egress of the circulating air out of the vent and results in an increase of pressure within the bin, the bird screen 19 will bend about the upper edge of the baffle 17 to substantially open the vent and allow the egress of pressurized air before damage to the bin structure can occur. Also, because the vent 10 is manufactured and shipped with its housing 12, flange 16 and bird screen 19 separate, it is possible to nest a plurality of housings in a single container, rather than having each housing being separately packaged.

Referring more particularly to the drawings, to secure the screen 19 to the flange 16, the two vertical marginal edges of the bird screen 19 are folded over to form pockets so that the pockets 19a that slidingly fit over the baffle 17 before the hood 12 is secured to the flange 16. The folds or pockets 19a in the screen 19 also serve to rigidify the screen, thus allowing it to maintain its proper position within the housing without being secured to the side members or top member thereof. Further, the screen 19 need not be welded or screwed to the baffle 17. Typically, the screen 19 is made of one-half inch square galvanized hardware cloth and, due to the construction of the hood, is fully recessed and shielded, thus avoiding any build-up of snow on the screen.

In order to provide a more aerodynamic profile for the vent, the housing has curved surfaces, and, in the illustrated embodiment, the edges at which the top member 15 join the side members 14 are arcuate. While such curved surfaces provide for reduced wind resistance and a more pleasing appearance, the curved seams that joins the top member to the side members present difficulties in fabrication and in insuring a watertight seam. A popular method of joining two pieces of sheet metal is the "Pittsburgh" lock as shown in FIG. 9. However, the lock portion 25 on the member 24 cannot be fabricated on a curved surface or arcuate edge. Further, the assembly of a Pittsburgh locking seam requires that the member 26 be preformed with an L-shaped bend at its marginal edge portion. Accordingly, the assembly of a sheet metal structure having a Pittsburgh locking seam requires at least four discrete steps: forming the Pittsburgh lock on one piece, forming the angled bend on the other piece, inserting the angled bend into the Pittsburgh lock, and bending over the extending portion of the Pittsburgh lock to secure the two pieces together.

In accordance with the present invention, a new locking seam, capable of being made along arcuate edges, is shown. Referring to FIGS. 6 and 7, the arcuate edge of the side member 14 is formed with a standing seam, generally indicated by 28, at a right angle thereto. Such an arcuate standing seam can be automatically made as disclosed in my copending application Ser. No. 645,039, filed Aug. 27, 1984. The standing seam 28 has a pocket 28a into which the marginal edge portion 15a of the top member 15 can be inserted. Then, in a single step, the pocket 28a of the standing seam 28, and the marginal edge portion of the top member 15 contained therein, can be bent down as shown by the arrow 30 in FIG. 6, to lie flush along the outside face of the side member 14. Accordingly, the manufacture of such a seam requires only three discrete steps: forming the standing seam on one piece, inserting the edge of the other piece into the pocket of the standing seam, and simultaneously folding the pocket and the edge. Thus, the assembled seam will appear as in FIG. 7, with the side member having a S-shaped fold along its marginal edge portion, the S-fold having an upward-opening pocket that receives a downward extending terminal edge of the top member, and the terminal edge of the S-fold being at a right-angle with respect to the side member so as to lie along the marginal edge of the top member. Because of the interlocking nature of this seam, it presents a watertight seam as in the Pittsburgh lock previously described, and, in practice, requires no welding or soldering to insure its watertightness.

Thus, it can be seen that a vent has been provided which fully meets the above-stated objects. While the invention has described in terms of a preferred embodiment, it is not intended to limit the invention to the same, but to include all equivalence and modifications within the scope of the accompanying claims.

What is claimed is:

1. A nestable vent for covering an opening in the roof of a grain storage bin, or the like, comprising, in combination, a housing with a pair of side members each having edges and a top member secured to the side members so as to be coextensive with the edges thereof and defining an interior with an air inlet and an air outlet;

a flange for locating and securing the housing over the roof opening, the flange including a baffle extending into the housing substantially across the width thereof between the housing side members; and a flat sheet screen member located substantially inwardly from the housing inlet and outlets and sized to extend across the interior of the housing so as to prevent ingress or egress through the vent other than through the screen, the screen having a lower portion secured to the baffle and having upstanding side portions and a top portion substantially free from binding contact by the housing side or top members so that if the screen should become clogged, pressure inside the bin will cause the upper portion of the screen member to bend about the baffle, thus releasing the pressure, before the pressure can reach levels capable of causing structural damage to the bin.

2. The combination of claim 1 wherein the baffle is coextensive with the lower edge of the roof vent opening when the flange is secured to the roof, the baffle being substantially vertically disposed and having at least one drainage hole therein to allow for the passage of condensation and the like out from the interior of the vent onto the roof.

3. The combination of claim 1 wherein the screen is folded at its marginal edge portions so as to form pockets on two of its opposite sides, the screen being removably received by the baffle by having the pockets slip over the upstanding edges of the baffle.

4. The combination of claim 1 wherein the side members and top member of the housing are secured together by a locking seam, the locking seam comprising an S-fold on each of the marginal portions of the edges of the side members, each S-fold having an upward-opening pocket that receives the downward extending terminal edge of the top member, the terminal edge of each S-fold being at an angle with respect to the side member so as to lie along the marginal portion of the top member.

5. The combination of claim 4 wherein the straight edges of the side and top members have rigidifying hems.

6. A nestable vent for covering an opening in the roof of a grain storage bin, or the like, comprising, in combination, a housing with a pair of side members each having an edge and a top member secured to the side members so as to be coextensive with the edges thereof:

a flange for locating and securing the housing over the roof opening, the flange including a baffle extending into the housing substantially across the width thereof between the housing side members; and a flat screen member disposed interiorly within the housing sized to extend across the interior of the housing so as to prevent ingress or egress through the vent other than through the screen, and folded vertical marginal portions on said screen member rigidify said screen member at its upper portion and forming vertically extending pockets along marginal vertical edges of the screen member, said pockets receiving therein vertically extending marginal portions of said baffle, said flat screen member extending substantially vertically from baffle and having said upper portion being located substantially centrally of said housing top member and protected thereby from snow loads.

7. A nestable vent for covering an opening in the roof of a grain storage bin, or the like, comprising, in combination, a housing with a pair of arch shaped side members each having an edge and an arcuate top member secured to the side members so as to be coextensive with the edges thereof and extending for greater than 90° and less than 180°;

a flange for locating and securing to a first end portion of the housing over the roof opening, and a screen member sized to extend across the interior of the housing so as to prevent ingress or egress through the vent other than through the screen, said screen being located substantially within the middle portion of said housing, folded vertical marginal portions in said screen member forming vertically extending pockets along vertical sides of said screen member, said pockets receiving therein vertically extending edges of said flange to join said screen member to said flange, and a substantial free upper end portion of the screen member being unattached to said vent housing; said folded vertical pockets stiffening said screen member at its upper free end portion.

* * * * *